United States Patent [19]

Sader

[11] 4,184,949

[45] Jan. 22, 1980

[54] PROCESS FOR SEPARATING HYDROCARBON POLLUTION FROM A HYDROORGANIC MEDIUM

[76] Inventor: Gabriel Sader, 23 Rue du chemin Vert, Paris, France, 75011

[21] Appl. No.: 856,171

[22] Filed: Nov. 30, 1977

[30] Foreign Application Priority Data

Mar. 12, 1976 [FR] France .............................. 76 36440

[51] Int. Cl.² ............................................. C02B 1/20
[52] U.S. Cl. ......................................... 210/43; 134/13; 134/40; 210/45; 210/53
[58] Field of Search .................... 210/42 R, 43, 44, 47, 210/51–54, 59, 73 W, 45, 49; 252/329, 331, 358; 134/13, 40

[56] References Cited

U.S. PATENT DOCUMENTS

| | | | |
|---|---|---|---|
| 2,051,983 | 8/1936 | McWCampbell | 210/54 |
| 2,149,748 | 3/1939 | Samuel | 210/43 |
| 2,191,922 | 2/1940 | Bruson | 210/54 |
| 2,264,448 | 12/1941 | Moller | 210/52 |
| 2,362,409 | 11/1944 | Samuel | 252/181 |
| 2,960,535 | 11/1960 | Bylsma | 210/54 |
| 3,350,304 | 10/1967 | Bacon | 210/52 |
| 3,707,464 | 12/1972 | Burns et al. | 210/44 |
| 3,756,959 | 9/1973 | Vitalis et al. | 210/54 |

*Primary Examiner*—Charles N. Hart
*Assistant Examiner*—Peter A. Hruskoci
*Attorney, Agent, or Firm*—Browdy and Neimark

[57] ABSTRACT

Water, polluted with hydrocarbons and similar pollutants in which separation occurs into an upper layer, rich in hydrocarbons and residues, and a lower layer consisting of a hydrocarbon suspension or emulsion in water, is treated to remove the pollutants from the water. The upper layer is treated with quaternary ammonium salts to separate the heavy residue from a clear (or light-colored) supernatant layer, analogous to fuel oil and reusable; the lower layer is then treated with a mixture of a polyose (starch, for example) and a coagulant (for example, ordinary alum) to obtain a practically pure water. This treatment may be applied to water containing oil products and, in particular, water collected from degreasing and dewaxing plants.

7 Claims, No Drawings

PROCESS FOR SEPARATING HYDROCARBON POLLUTION FROM A HYDROORGANIC MEDIUM

FIELD OF THE INVENTION

The present invention relates to the field of treating hydroorganic media, particularly water polluted with hydrocarbons and various residues, in order to separate the principal components and eliminate hydrocarbon pollution from the water. It relates, more particularly, to a process for separating greases, waxes, and other oil products from an aqueous medium and is particularly advantageously applied to the waste water obtained from the dewaxing and degreasing of objects temporarily protected against oxidation and bad weather by a protective coating of oil or wax.

BACKGROUND OF THE INVENTION

Separation of various hydrocarbons, polluted with residues to a greater or lesser degree, from an aqueous medium raises technical problems which are often difficult to resolve. Numerous solutions have been proposed for each individual case to which they must be adapted. For example, in the attempt to remove crude oils spilled at sea, use has been made of either physical or mechanical processes for removing the "black tide" layer, or of chemical processes intended to cause coagulation and suspension of hydrocarbon particles which are then separated to a greater or lesser degree from the water by various means.

Another source of such hydroorganic media which must be separated, very frequent in practice, relates to the degreasing or dewaxing of various materials, such as, in particular, automobiles (buses, trucks, and passenger cars), and machine tools. Such degreasing or dewaxing processes take place in industrial plants, such as refineries and textile dyeing mills, and in the food industry, etc. In general, machines capable of spraying jets of water or steam at a pressure of several bars are used to clean off the film of monomer or polymer hydrocarbon compounds (included under the general term "wax") which temporarily protects these materials during storage and/or transport. A small quantity of solvent is introduced into the water spray (kerosene or the like) to facilitate elimination of all traces of oil or grease.

The aforementioned processes, particularly water spraying, are indeed very effective, but their implementation gives rise to enormous quantities of aqueous liquids polluted by large fractions of organic compounds and various wastes and residues. Very often this waste water is discharged untreated into the sewer which causes dangerous contamination and pollution of water courses, rivers, and underground water. Moreover, the treatment required to separate the hydrocarbon fraction calls upon techniques which are generally too complex and cumbersome for many industrialists.

SUMMARY OF THE INVENTION

The present invention solves this difficult problem of separation of hydrocarbon-rich substances of all types and polluting wastes and residues from an aqueous medium. For this purpose a simple economic solution is proposed which avoids the use of expensive apparatus and products. It also enables relatively clean water to be discharged into the sewers, in accordance with the terms of current legislation, and enables the recovery of most of the organic fraction so that it can be reused, for example, by recycling to the cleaning plant.

As a general rule, the hydroorganic media with which the present invention deals, and which result from a cleaning operation of the aforementioned type, separate into two relatively distinct layers because of their difference in density: an upper layer rich in hydrocarbons and including numerous residues, this layer generally being a dark brown color, and a lower layer with a turbid appearance and a milky white color comprised of a suspension or emulsion of a small quantity of hydrocarbons or other organic substances in water. These layers may be separated by primary decantation.

It has been found, surprisingly, that by using fairly inexpensive chemicals, known of themselves, it is possible to separate the organic medium fully from the aqueous phase.

DETAILED DESCRIPTION OF PREFERRED EMBODIMENTS

In its most general form, the process according to the present invention consists of treating the upper layer with a quaternary ammonium salt or mixture of salts while the lower layer is treated with a generally powdered mixture of a coagulation agent and a polyose, said treatment being conducted while the hydroorganic medium is being stirred, followed by decantation-flocculation with separation of the residues, water, and a reusable hydrocarbon phase.

In the present specification, "hydrocarbon" or "hydrocarbon compound" is understood to be any substance, or mixture of substances, including a major proportion of saturated hydrocarbons such as, in particular, oils and the refined products of crude oil such as white spirit, gas, oil, kerosene, paraffin, fuel oil, etc.

It is known that the polyoses are one of the groups in the glucide family, the other group being the ones (or monoses), namely nonhydrolyzable reducing sugars. Any type of polyose (or oside) may be suitable according to the present invention, namely the holosides or polyholosides such as maltose, lactose, saccharose, or the higher polyholosides such as starch, or heterosides, namely compounds giving oses plus other organic compounds by hydrolysis. Of these compounds, starch is particularly suitable and has the advantage of easy accessibility at a modest cost.

Any of the products currently used in waste water treatment can be used as the coagulation agent, with or without the addition of polyelectrolyte.* However, it is particularly advantageous to use alums, namely double sulfates of various metals and, of these, common alum or double aluminum-potassium sulfate, which is commercially very accessible.

*Amongst the known coagulation agents are convenient: ferric salts as ferric chloride and, amongst the polyelectrolytes: cationic polymers and anionic polymers.

The quaternary ammonium salts used to treat the aforesaid supernatant layer may be composed of any one of the products already used to treat water because of their algicidal, bactericidal, germicidal or other effects. In general, these are halogenated salts of amines or quaternary ammonium hydroxides, such as alkyldimethylbenzyl ammonium chloride in which the alkyl group is $C_8$–$C_{16}$ or mixtures thereof, or corresponding chlorobenzyl derivatives. Other such quaternary ammonium compounds having fatty chains may also be used. See, for example, C. A. Lawrence, *Quaternary*

*Ammonium Germicides,* Academia Press, New York (1950).

The quantities of additives to be used in the process according to the present invention aare obviously a function of various parameters such as the type and quantity of organic pollutants to be treated, the ratio of water to organic product, the separation time, the temperature, the type of agitation, etc. In practice, in the majority of cases, the additive ranges will be the following:

0.05 to 10 parts (by weight) and preferably 0.5 to 5 parts of quaternary ammonium salts for 100 parts of supernatant layer (or first aforesaid layer);

1 to 20 parts (by weight) of the polyose-coagulant mixture, the proportions of the latter to one another varying between 10 and 90 parts of the one to 90 to 10 parts of the other, for 100 parts of the turbid or milky layer (said second aforesaid layer).

In order to implement the process according to the present invention, various techniques known of themselves can be used. For example, after allowing the hydroorganic medium to be treated to separate, each of the two phases is drawn off and subjected to agitation for a few minutes in the presence of the aforesaid additives corresponding to each phase or layer. Each layer is then again allowed to settle. The first layer is separated into an organic residue which is discarded and a clear or light-colored reusable organic phase and the second layer is separated into an upper reusable organic phase and a water decantate which can be recycled in a dewaxing or other plant or discharged into the sewer without constituting a pollution hazard. According to another technique, one may directly add, while stirring, the mixture of additives to the hydro-organic medium to be treated without its first being separated into two layers, the remainder of the operations being performed as above. However, in this case, the organic elements plus residues are less clearly separated from the water and the water sometimes still contains traces of hydrocarbon pollution.

Tests were performed by the applicant on media coming from dewaxing plants using the following as additives: starch, ordinary powdered alum and various quanternary ammonium salts, such as, for example, products sold under the trademarks: HYAMINE 3500 made by Rohm and Haas (alkyldimethylbenzyl ammonium chloride, the alkyl being a mixture of 50% $C_{14}$, 40% $C_{12}$ and 10% $C_{16}$) and Barquat MB (same composition as HYAMINE 3500) and Bardac 22 (dimethyl di-n decylammmonium chloride) made by Lonza Werke. It was found that treatment of the lower decanted layer, after decantation-flocculation, enabled to be obtained a heavy phase composed of water with practically no wax product (which was eliminated in the supernatant layer with the residues) and, after treatment of the second layer, or the aforesaid upper layer, that it was possible to fully separate a heavier bottom layer of waxy residue and a supernatant layer of a light-colored flammable substance analogous to domestic fuel oil and able to be reused. It has been found that, among other applications, this upper layer product is an excellent anti-seizing agent.

In addition to the aforementioned advantages, the process according to the present invention is useful in that it does not introduce into the environment substances which degrade into harmful substances likely to be present in waste water, and it does not, as in known techniques, employ detergents or emulsifiers which are difficult to remove from water discharged into rivers.

It will be obvious to those skilled in the art that various changes may be made without departing from the scope of the invention and the invention is not to be considered limited to what is described in the specification.

What is claimed is:

1. A process for the treatment of waste water containing the residues from dewaxing processes in which the protective films of monomer of polymer hydrocarbon compounds on vehicles, machine tools or the like, are cleaned off by means of pressurized water to form said residue-containing waste water, comprising:

allowing the residues to settle from said waste water until separation into a substantially organic phase layer and a substantially aqueous phase layer is achieved;

removing said substantially organic phase layer from said substantially aqueous phase layer;

treating the substantially organic phase layer, under agitation, with 0.05 to 10 parts by weight, per 100 parts of said layer, of quaternary ammonium salt, to obtain a reusable hydrocarbon fraction and a discardable organic waste fraction;

treating the substantially aqueous phase layer, under agitation, with 1 to 20 parts by weight, per 100 parts of said aqueous layer, of a mixture of 10 to 90 parts of polyholoside and 90 to 10 parts of alum, to obtain a reusable hydrocarbon fraction and a substantially clean water fraction.

2. A process in accordance with claim 1, wherein said polyholoside is starch.

3. A process in accordance with claim 1, wherein said alum is double aluminum-potassium sulfate.

4. A process in accordance with claim 1, further including the steps of, after said step of treating the substantially organic phase layer, allowing the treated layer to settle and removing the reusable hydrocarbon fraction.

5. A process in accordance with claim 4, further including the steps of, after said step of treating the substantially aqueous phase layer, allowing the treated layer to settle and removing the reusable hydrocarbon fraction.

6. A process in accordance with claim 1 wherein said quaternary ammonium salt comprises one or more members of the group consisting of alkyldimethylbenzyl ammonium chlorides or corresponding chlorobenzyl derivatives, in which the alkyl group is $C_8$–$C_{16}$.

7. A process in accordance with claim 1 wherein said polyholoside is selected from the group consisting of maltose, lactose, saccharose and starch.

* * * * *